(12) United States Patent
Adolf et al.

(10) Patent No.: US 6,179,340 B1
(45) Date of Patent: Jan. 30, 2001

(54) CONNECTION FITTING WITH AN ATTACHMENT PROJECTION

(75) Inventors: Jürgen Adolf, Denzlingen; Mario Bartholomä, Winden; Volker Götz, Kenzingen; Fritz Zügel, Waldkirch, all of (DE)

(73) Assignee: Anton Hummel Verwaltungs GmbH, Waldkirch (DE)

(*) Notice: Under 35 U.S.C. 154(b), the term of this patent shall be extended for 0 days.

(21) Appl. No.: 09/263,466

(22) Filed: Mar. 5, 1999

(30) Foreign Application Priority Data

Mar. 19, 1998 (DE) .............................. 198 12 079

(51) Int. Cl.⁷ ...................................... F16L 5/00
(52) U.S. Cl. ........................ 285/140.1; 439/555
(58) Field of Search ................. 285/140.1, 210, 285/209, 208, 207, 206, 205, 403, 322; 411/508, 913; 439/555, 556

(56) References Cited

U.S. PATENT DOCUMENTS

| | | |
|---|---|---|
| 2,514,504 * | 7/1950 | Moline ............................. 285/140.1 |
| 3,139,768 * | 7/1964 | Biesecker ............................ 411/508 |
| 3,514,129 | 5/1970 | Holdren . |
| 4,441,744 | 4/1984 | Oostenbrink et al. . |
| 4,674,930 * | 6/1987 | Poe et al. ............................. 411/508 |
| 4,844,859 * | 7/1989 | Coussau ............................ 285/140.1 |
| 5,068,496 | 11/1991 | Favalora . |
| 5,090,644 | 2/1992 | Lenker . |
| 5,122,076 * | 6/1992 | Pitts .................................... 439/555 |

FOREIGN PATENT DOCUMENTS 37 41 921 A1    6/1989  (DE) .

\* cited by examiner

*Primary Examiner*—Lynne H. Browne
*Assistant Examiner*—Aaron M Dunwoody
(74) *Attorney, Agent, or Firm*—Akin, Gump, Strauss, Hauer & Feld, L.L.P.

(57) ABSTRACT

A connection fitting (1) for attaching tubes, corrugated hoses, pipes, cables or other oblong bodies (2), in an opening or hole (3) of a wall (4), of a housing is provided. In this, the connection fitting (1) has an attachment projection (5) that can be anchored in the opening (3) and has retaining projections (8) located on abutment contact studs (7) formed by axial slots (6) that project radially outwardly across from a constriction. The abutment contact studs (7) and their retaining projections (8) are designed such that they have only a part of their retaining effect after insertion of the attachment projection (5) into the opening (3), i.e. they can be moved out of the opening (3) under a loading opposite to the insertion direction. For a final attachment that is resistant to pulling force and compression, an axially movable and somewhat sheath-shaped lock (16) is provided inside the connection fitting (1) which locks the abutment contact studs (7) with their retaining projections (8) in the usage position against a radially inwardly directed deformation, and in particular additionally pivots them outwardly so that the locking and retaining surfaces (9) of the retaining projections (8) engage behind the edge (12) to a greater extent than in the preliminary mounting position.

18 Claims, 4 Drawing Sheets

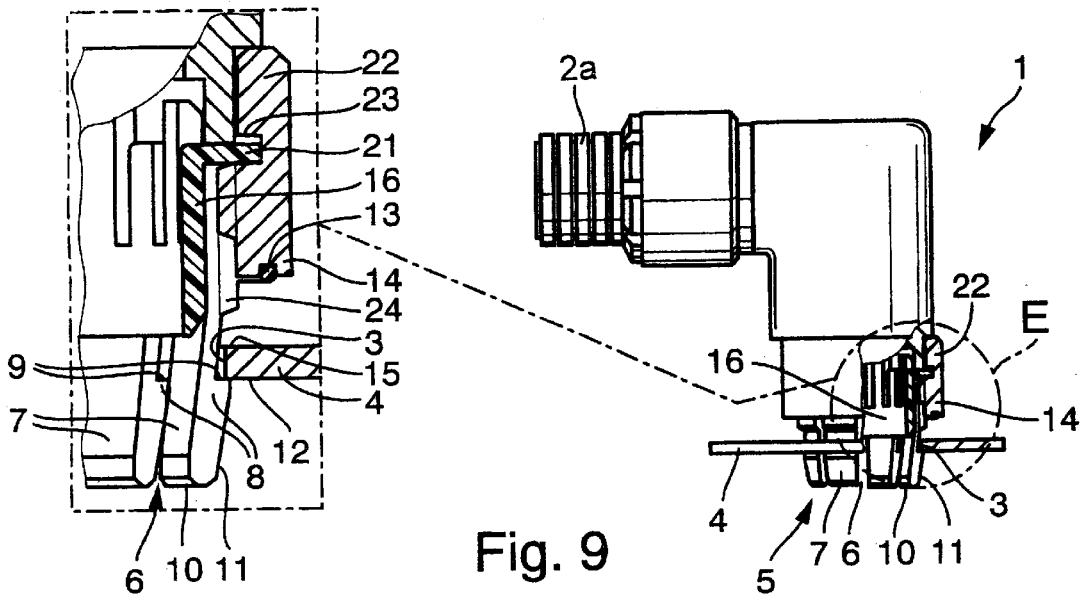
Fig. 9
Fig. 9 E
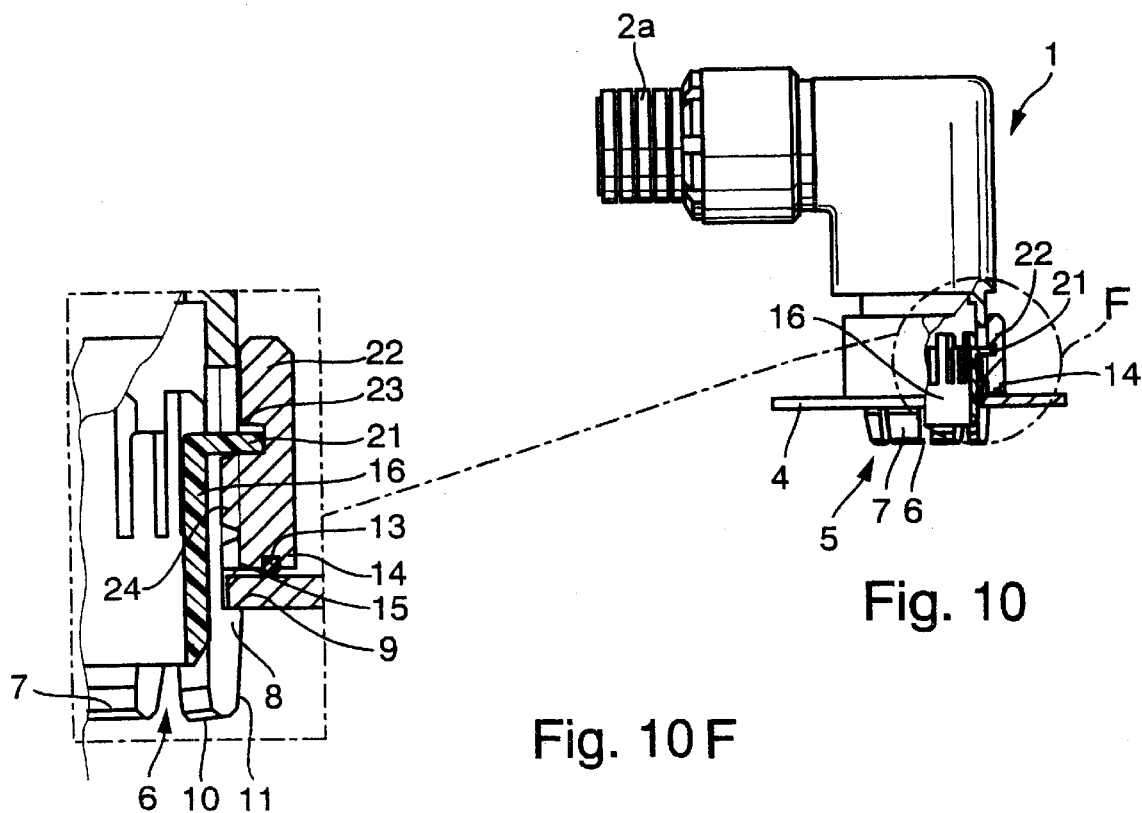
Fig. 10
Fig. 10 F

CONNECTION FITTING WITH AN ATTACHMENT PROJECTION

BACKGROUND OF THE INVENTION

The invention involves a connection fitting, such as an angular fitting or T-shaped fitting, for attaching oblong bodies, for example, tubes, corrugated hoses, pipes, cables or the like, at an opening or a breach or a hole, for example in a wall of a housing or the like. The connection fitting has at least one attachment projection that is divided by open slots into abutment contact studs, on the open ends of which are arranged radially outwardly projecting retaining projections. The abutment contact studs can be radially inwardly deformed by the hole edge when the attachment projection is pressed into the opening, the breach or equivalent hole. Behind the edge, the abutment contact studs move into the mounting position in which the retaining projections at least partially grasp behind this edge, and where at least one stopper is arranged at a distance from these retaining projections and, in the usage position, lies on the hole edge or the opposite edge of the hole that is grasped.

A connection fitting of this general type—but only in the form of a connection piece, i.e. not in the angular or T-shaped design—is known from the U.S. Pat. No. 5,068,496. The radially outwardly projecting retaining projections of the abutment contact studs are practically no longer able to be detached because of their elasticity and shape after catching behind the edge of the hole or breach, rather the retaining projections take on their mounting position in the usage position automatically after the retaining projections have been inserted into the hole or breach. The abutment surfaces of the retaining projections are thereby arranged in an approximately radial plane, so that they grasp behind the hole edge with their entire surface so that when a clamping nut functioning as a stopper is tightened, they can not be pulled back again in an undesired way into the hole or breach. Moreover, they must be able to resist, on the one hand, this tensile force coming from the clamping nut and on the other hand, also be able to resist a possible stress of the cable, hose or similar oblong body.

This means, however, that in the case of a disassembly of this connection fitting, the abutment contact studs must be pushed inward with a tool, which is only possible from the inside of the housing or the wall, on which the hole or the breach is located. A disassembly is then thus only possible when this rear side of the wall that has the breach or the like is accessible, which is not the case for some housings or arrangements of these types of walls. Even in the case where it is accessible, however, this type of disassembly remains difficult because manipulations must be made from both sides of the wall.

SUMMARY OF THE INVENTION

Therefore, the purpose of the invention is to create a connection fitting of the above-described type, with which on the one hand, a firm seating can be obtained on a breach or a hole in a wall, for example, a housing wall, and in spite of this, however, a simple mounting is possible from the outside of such a housing, namely from the side of the entrance of the oblong body into the breach or the hole.

To achieve this apparently contradictory task, the previously defined connection fitting is characterized in that the abutment contact studs and the radially projecting catching or retaining projections opposite it are shaped and/or dimensioned in such a way that they catch on the edge so that they can be detached after insertion into the opening or the like, and can be moved out or pulled back again out of the opening or the like under loading acting opposite the insertion direction or under tensile and/or pivoting load, and that an axially movable lock is located inside the connection fitting that is arranged in the detaching position outside of the area of the abutment contact studs or retaining projections and is arranged in the usage position so as to engage between them, and locks the retaining projections in this usage position against a radial inward deformation.

In this manner it is possible to dismount the connecting fitting from the outside of a housing or from the side of a wall—not including its attachment projection—on which it is arranged. After the release of the lock, the connecting fitting can be pulled out. However, it is seated firmly in the usage position when the lock is located in the functioning position, i.e. moved in the axial direction between the catch studs and the retaining projections, and can absorb tensile forces exerted on the oblong body, i.e. a pipe, a hose, a cable or the like. If the lock, on the other hand, is moved back or pushed back axially out of its usage and functioning position, the retaining projections can be deformed in the radially inward direction under force or loading, particularly tensile loading acting opposite the insertion direction, possibly during the simultaneous pivoting of the connection fitting, so that in this way the attachment projection of the connection fitting can be pulled out again from the breach or the hole.

An embodiment possibility can therefore comprise the catch surfaces of the retaining projections, which in the usage position grasp behind the inside edge of the hole or the breach and rest on this edge, are beveled with respect to a plane running radially to the connection fitting such that the slope runs from the inside to the outside away from the edges of the breach so that a cone expanding in a direction away from the inside of the hole results. During a pulling back of the connection fitting for disassembly, this cone then causes the radially inward bending of the abutment contact studs, which however, is only possible when the lock has been previously moved back out of its area.

The sloped surfaces of the retaining projections facing the edge of the breach in the usage position can run in a concave or spherically convex manner and/or in some sections, straight. There could thus be, depending on the requirements for the retaining force, differently shaped sloped surfaces provided as catch surfaces on the retaining projections. In this way, the resistance against a withdrawal can be increased or decreased. This can then be advantageous when at first, as the locking catch can be lifted again by pulling it back, the assembly should be able to readily transfer certain forces.

Another or additional embodiment possibility includes the abutment contact studs, on their area located within the breach or hole in the usage position, having a smaller outer dimension, in particular a smaller outer circumference or diameter than the breach or the hole, and via the lock that can be moved in the axial direction between them, can be spread apart or expanded. In this way, for abutment contact studs that have not yet been spread apart, a smaller, namely only partial contact of the abutment or catch surfaces of the retaining projections results on the edge of the hole or breach that is grasped from behind by them. The retaining projections thus do not grasp behind the hole or the breach with a dimension sufficient for a fixed anchoring and/or do not grasp with their entire dimension, but instead to a certain extent only by their radially outside end area, so that without the lock moved between them, an ordinary or relatively small tensile force is sufficient in order to pull them out of the hole or breach again. Thus, they are initially held on the hole or the breach. Only through the insertion of the lock into its functioning position are the abutment contact studs or fingers then expanded to such an extent that their catch or abutment surfaces can be sufficiently or completely effective and can no longer be pulled out without any sort of damage, without removing the lock.

In an expedient way, the connection fitting is thus designed so that the retaining surfaces of the abutment contact studs only extend beyond the circumference of the breach or hole by a portion of their dimension in such a way that, when the abutment contact studs are not spread apart by the lock when the lock is located outside of the abutment contact studs, the fitting is held so that it can be withdrawn from the opening. Thus, the fitting can assume a preliminary mounting position and also maintain it, or be withdrawn after a fixed installation, by withdrawing of the lock to a position from which the fitting can then be withdrawn again without problems, since the abutment contact studs are constructed to be elastically resilient and automatically move radially inward after the withdrawing of the lock.

An expedient and advantageous embodiment of the invention can be provided in that the axially moveable lock that is especially shaped like a sheath, has at least one projection, projecting radially inwardly or outwardly, which can be impinged by the insertion of the oblong body into the inside of the connection fitting. Thus, by the insertion of the oblong body against or into the lock, the lock can be moved into its usage position, i.e. into its locking position. Thus, it can also be achieved that the connection fitting that is then held only in a preliminary mounting position—also able to be withdrawn again—is locked in its usage position by the insertion of the oblong body to be held by it and locked and secured against forces pulling it back, where the insertion of the oblong body to be held automatically causes the shifting of the lock into its locking position.

In this way, the projection projecting to the inside in the lock can be deformable or able to be bent against a restoring force and in the usage position, it can rest on the outside of the oblong body with pressure. Thus, the oblong body can deform and bend this flexible projection during insertion and when it impinges, in the process, thereby automatically coming into frictional engagement with this projection so that the lock is carried along with it and can be shifted to the usage position. Furthermore, it can simultaneously have a sealing effect when correspondingly designed.

In addition to this it can be advantageous if in the inside of the lock as a projection, at least one lip is provided that projects radially to the inside, especially arranged on the entire inner circumference of the lock. A lip of this type can be deformed especially well by the insertion of the oblong body and thus be opened by the penetration of this oblong body so that it rests on the outer side of the oblong body under the pressure of its restoring force. This causes the already mentioned shifting of the lock during the insertion of the oblong body, for example, a cable, until the lock reaches a stopper shoulder or opposing stop within the connection fitting, where it has reached its final usage position.

It is therefore expedient if within the connection fitting a stop for the lock projects inwardly. Along with this function bf the lip, to activate the automatic shifting of the lock, it can as also already mentioned, act as an additional seal, when the projection projecting radially inwardly of the lock or the lip is arranged in a continuous manner extending around the inner circumference of the lock.

The inside lying stop for the lock can be arranged at the start of the catch studs. Through this inside lying stop, the usage and functioning position of the lock, in which it prevents a spring-back movement of the abutment contact studs radially to the inside, can thus be pre-set and predetermined.

An advantageous embodiment of the connection fitting and in particular its lock can provide that an axial adjustment of the lock can also occur independently of the oblong body to be attached, so that thus this oblong body can be brought first in an almost resistance-free manner into its desired position and then the lock adjusted into its locking position. Vice-versa, however, a connection fitting can also be set up with the lock without an oblong body being grasped. This can be especially advantageous for angle pieces which then only function to orient the cable or similar flexible oblong body in a specific direction.

This expedient embodiment can provide that the lock is constructed as a sheath which—especially on its edge that faces away from the locking position—has at least one actuation projection projecting radially outwardly across from the outer side of the lock, which extends beyond the outer dimension of the sheath-shaped lock and in the usage position, engages in an axially movable slot between the abutment contact studs, and projects and juts out to the outside through it. In this way, the user can grasp this actuation projection in a suitable manner and move it in the direction established by the slot, i.e. in the axial direction, such that the sheath-shaped lock can be brought into its corresponding position, especially in its locking position.

It is especially functional in the process, if for the axial adjustment of the actuation projection or—even better—several actuation projections, a ring that can be axially adjusted and fixed and that impinges the actuation projection (s), is provided on the outside of the connection fitting. Since several abutment contact studs are present, there are also several slots distributed uniformly between them on the circumference of the connection fitting and its attachment projection, so that correspondingly many actuation projections are arranged on the lock lying inside and can be extended to the outside through these slots. However, the number of these attachment projections need not necessarily correspond to that of the slots. This then allows the arrangement of a single actuation ring that can grasp all of these projections, which functionally lie in a common diametrical plane, and that can carry them along in its own axial adjustment. The operation of it is just as simple.

A favorable constructive solution can consist in that in the inside of the ring, at least one ring groove is arranged, into which the radially projecting actuation projection(s) grasp in a positive fit manner. Thus, this ring which allows for the adjustment of the lock can be moved in both axial directions and bring the lock respectively either into the locking position or, instead, out of locking position.

As previously noted, the sheath-shaped lock can have distributed on its circumference several actuation projections that are separated from each other by axial slots and that can be held as a single piece by resilient rails separated by the slots. These resilient rails that each carry an actuation projection can thus be deformed in the radial direction so that it is possible to move the actuation ring with its inner ring groove over the attachment projections, whereby they are deformed radially inwardly, until the ring groove is at the position of the actuation projections such that they spring-deflect into the groove because of their elasticity with these actuation projections and by this, resume their starting position, but now however, are grasped over by the actuation ring and its ring groove.

In this manner, the lock can have on its end that faces away from the locking position, more axial slots than radially projecting projections distributed on its circumference, and preferably twice as many axial slots as the actuation projections. Thus, a projection of this type need not be provided on each resilient rail of the lock, thus resulting in a sufficiently large number of actuation projections, uniformly distributed on the circumference, in order to grasp them together with the help of a ring and to be able to move them without danger of jamming.

An especially favorable design for operation can provide that the ring provided for shifting the lock is a nut having internal threads that fit together with a adjustment threads provided on the outside of the connection fitting, and these adjustment threads are arranged on the outer sides of the abutment contact studs continuing respectively over the slots located between them. Of course, the inner threads of this nut do not extend beyond an internally lying ring groove, but instead ends on or in front of it. For an adjustment movement, the ring needs merely to be turned, in order to convert this rotational movement into the desired axial adjustment movement, because of the threads acting together.

The shifting of the lock into the locking position can— independently of how the adjustment movement is performed—be made easier in that the front-side edge of the lock located in the locking area is slanted and/or rounded off on the outside. Thus, a gradual displacement and sweeping of the abutment contact studs in their external locking position results when the lock is gradually inserted between them and is then pushed further forward.

It should in addition be mentioned that the ring provided for the adjustment of the lock can be simultaneously pulled on in an embodiment as a nut for the axial setting of the entire fitting.

In a customary manner, the oblong body, for example, a cable, pipe, hose or the like can be clamped or set using an outside screwed connection onto the fitting in a manner suitable for strain relief. For the disassembly, only one outside threaded joint or attachment of this type then needs to be released and then the oblong body is to be pulled back, such that the lock that is connected in a clamping or friction-fit manner is pulled back automatically so that in this way the abutment contact studs are released radially inwardly by an elastic spring-back and now only hold the connection fitting against a relatively small force, so that they can be withdrawn easily from their hole or their breach. Thus, a very simple disassembling capability results, especially when one or more of the characteristics and measures described herein are combined.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1A is an enlarged detail of a portion of FIG. 1 as indicated by "A".

FIG. 2B is an enlarged detail of a portion of FIG. 2 as indicated at "B " showing the finalcatching and locking position, FIG. 5c is an enlarged representation of a portion of FIG. 5 indicated by "C", which shows this only partial catching in an enlarged manner, FIG. 6D is an enlarged representation of a portion of FIG. 6 indicated at "D" the catching of a retaining projection.

FIG. 9 is a side view, shown partially in cross-section, of another embodiment of a connection fitting in accordance with the invention that is designed as an angle piece, that is not yet finally engaged, and that has a lock that can be moved axially using projections which project radially outwardly, in particular, with the help of a ring that can be screwed down, FIG. 9E is an enlarged detail of a portion of FIG. 9 as indicated at "E", FIG. 10 is a view similar to FIG. 9, after the movement of the lock through axially screwing down of the ring that moves the projections of the lock, to the engaged position, FIG. 10F is an enlarged detail of a portion of FIG. 10 as indicated at "F"

DETAILED DESCRIPTION OF THE INVENTION

Figure 1:
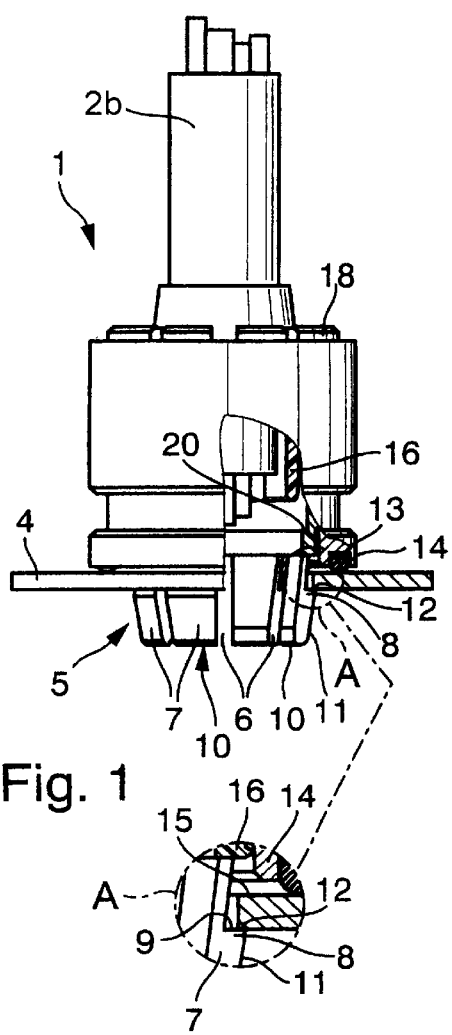
FIG. 1 is a side view depicted partially in a lengthwise cross section, of a connection fitting according to the invention for a cable that can be passed through a wall opening and set there, in preliminary mounting position, in which retaining or locking projections of locking contact studs of this connection fitting are engaged on the edge of the wall opening in a manner so that they can be detached, and can be pulled back out of the opening opposite the plug-in direction again, for example, through a tensile load*ig on the connection fitting, with the only partial catching.

In the following description, the described embodiments contain objects or parts having the same function which have been identified with the same reference numbers, although the outer form may vary.

A connection fitting designated in general as 1 is used for the attachment of an oblong body, for example, of hoses (not shown), corrugates hoses 2a (shown in FIGS. 5–10), pipes (not shown), cables 2b (shown in FIGS. 1–4), to an opening 3 in a wall 4, for example, of a housing or the like.

The connection fitting 1 has an attachment projection designated generally as 5, which is arranged in the usage position opposite the larger part of the connection fitting 1 on the other side of the wall 4. The opening 3 is generally a circular hole or a comparable breach.

As shown in FIGS. 1 and 2, 5 and 6, as well as 9 and 10, the attachment projection 5 is divided by slots 6 that run in the axial direction to the free end of the attachment projection 5 and are open there, and also pass through in the radial direction, into several abutment contact studs 7 uniformly distributed on the circumference, which are referred to in following as "contact studs 7" for short. On the free end of these contact studs 7, i.e. on the end that for the most part faces away from the connection fitting 1, these contact studs 7 have retaining projections 8 projecting radially outwardly. As shown in the figures these projections 8 still have a distance extending from their actual catching and retaining surface 9 to the front side 10 of the end of these contact studs 7, i.e. the retaining projections 8 have a certain axial extension. Thus, they can run conically or at a slant on the outer side 11, in order to allow for easier insertion into the opening 3 and an elastic compression caused by this in the radial direction into the center, until the catching and retaining surfaces 9 pass behind the wall 4 opposite to the remaining part of the fitting 1, such that they come into contact, in the usage position thus obtained, on the edge 12 of the opening 3 that is now grasped behind.

In all of the embodiments there is provided at a distance from the retaining projections 8 and their retaining surfaces 9 a stopper 14 containing a seal 13. The stopper 14 has a distance from the retaining surfaces 9 in the usage position, which corresponds to the thickness of the wall 3 so that this stopper 14 rests in the usage position on the edge 12 of the opening 3 lying opposite the side of hole edge 15, that is grasped from behind.

Figure 5:
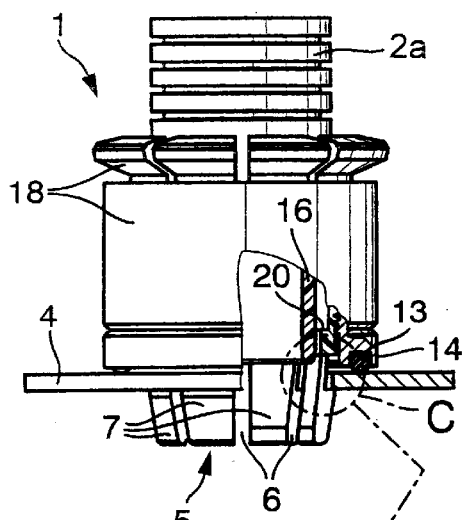
FIG. 5 is a side view, partially in cross-section, of a modified form of the connection fitting according to another embodiment of the invention, which is adapted for the setting of a corrugated hose, where the lock is still located in the open position and the retaining projections are only partially engaged.

In FIGS. 1, 5 and 9, it is shown that the resilient abutment contact studs 7 that can pivot and the radially projecting retaining and catching projections 8 are shaped and dimensioned in such a manner that they only partially and thus detachably engage on the edge 12 after insertion into the breach or the opening 3 with their locking and retaining surfaces 9, and under a loading acting opposite the plug-in direction, for example, a tensile load on the fitting 1, or even a pressure load on the attachment projection 5, possibly combined with a pivoting load, are able to be moved out again or withdrawn from the breach or the opening 3. Especially in the FIGS. 1A, 5C and 9E, it can be recognized that only a quite small part of the respective catching and retaining surface 9 of the retaining projections 8, grasps behind the edge 12 of the opening 3 so that a small force acting in the axial direction opposite the plug-in direction is able to detach a connection of this type again. The fitting 1 can thus be attached to an opening or similar breach 3 according to the aforementioned FIGS. 1, 5 and 9, in a preliminary mounting position and can be detached. In the same manner, the entire fitting 1 can be mounted again in this way, if the lock 16, as explained in detail below, is moved back from its locking position, so that the mounting projections 8 also set back into this "preliminary mounting position" because of the elasticity of the abutment contact studs 7.

Figure 2:
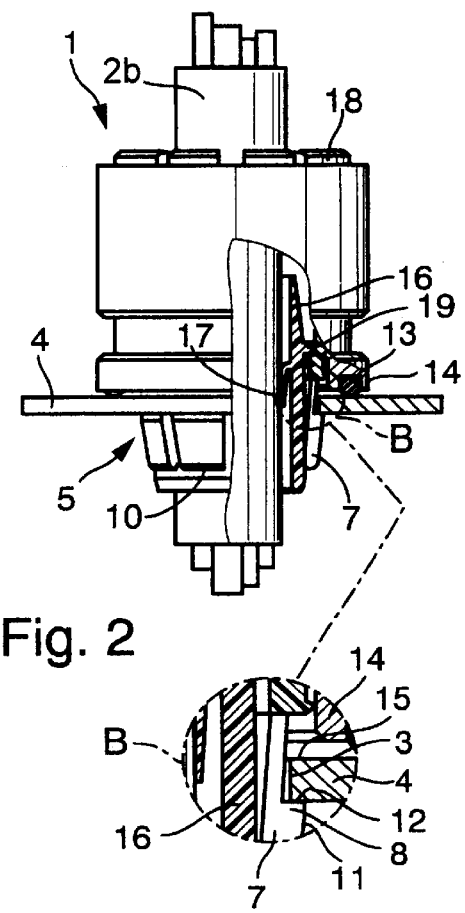
FIG. 2 is a side view similar to FIG. 1 after the final engagement through the axial movement of a lock located in the inside of the connection fitting.
Figure 6:
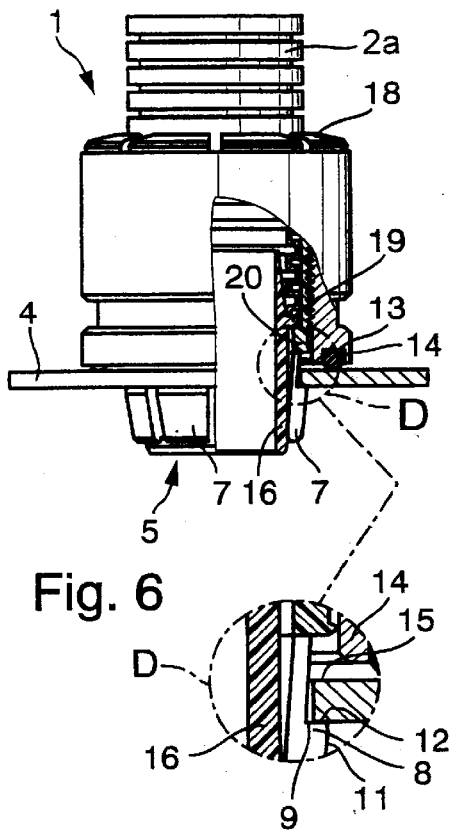
FIG. 6 is a view similar FIG. 5 in the final engaged and locked position.
Figure 7:
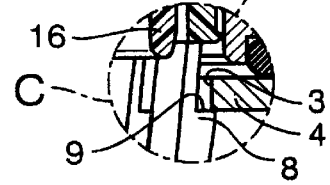
FIG. 7 is a detailed view of the lock provided for the embodiment according to FIGS. 5 and 6 and the corrugated hose prior to the two acting together.
Figure 7:
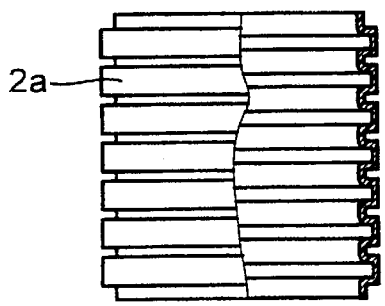
Figure 7:
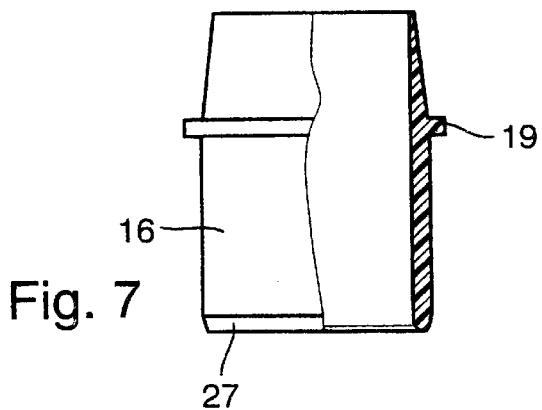
Figure 8:
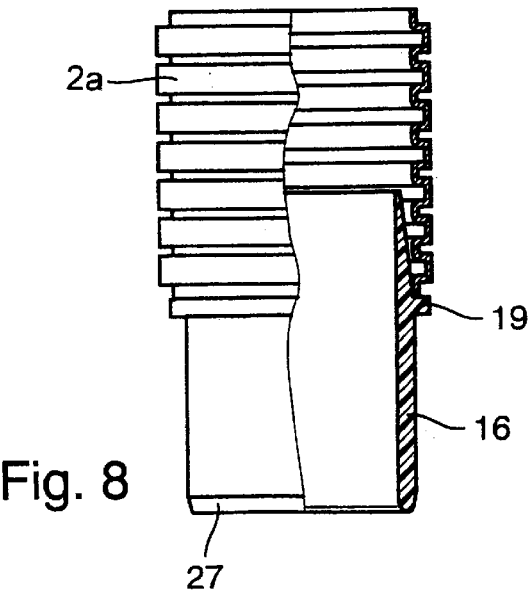
FIG. 8 is a side view, shown partially in longitudinal cross section, of the lock and the corrugated hose in functioning connection, in which the front side of the corrugated hose is supported on an outside surrounding stopper or shoulder of the lock, so that the insertion of the corrugated hose into the inside of the fitting simultaneously moves the lock into locking position according to FIG. 6, in which it hits with this stopper or shoulder for its part within the connection fitting.

The connection fitting 1 has the aforementioned axially movable lock 16, which is arranged in the detachment position according to FIGS. 1, 5 and 9 outside of the area of the contact studs 7 and mounting projections 8, and in the usage position according to FIGS. 2, 6 and 10, is arranged between them so as to be in engagement, such that it has been moved in the axial direction from the above-described detachment position into the locking position. In this locking position, the movable lock 16 blocks the contact studs 7 against radially inwardly directed deformation or pivoting and where it pivots and deforms them, additionally during this locking movement, further radially outward from the detachable catching position, so that it brings the mounting projections 8 into the mounting position, especially as shown in FIGS. 2B, 6D and 10F, in which the catching and retaining surfaces 9 are more or less completely effective and grasp behind the edge 12 of the opening 3.

In one preferred embodiment, the catching and retaining surfaces 9 lie in a radial plane, which produces a good retaining force and barb-type connection with the opening edge 12. Because of the lock 16, however, it would be possible to design the catching surfaces 9 of the retaining projections 8 to slant somewhat relative to the plane running radially to the connection fitting 1, such that the slope extends away from the inside to the outside of the edges 12 of the breach 3 so that a cone that is expanding and directed away from the inside of the hole 3 would be formed. This would result in a preliminary mounting position that is even better in its ability to detach, in which the retaining projections 8 could grasp around the edge 12 to a greater extent in the radial direction, because they could again recede more easily radially inwardly under a loading acting in a direction opposite the plug-in direction, due to the slope of the retaining surfaces 9. However, this would result in a smaller support surface in the locking position.

As clearly shown in FIGS. 1, 5 and 9, the abutment contact studs 7 have in their usage position within the area located within the breach 3 or the opening or hole, a smaller outer dimension, in particular, a smaller outer circumference or diameter than that of the breach or the opening 3, and using the lock 16 that can be moved in the axial direction between them, are expandable and able to be spread apart, as is shown by the respective comparison between FIGS. 1 and 2 or FIGS. 5 and 6 or FIGS. 9 and 10. Thus, a neck area, having a reduced diameter relative to the retaining projections 8, is provided on the mounting projection 5, which extends in the usage position within the opening or the hole 3, and can be pressed by the lock 16 onto the inside of the opening 3.

The removable mounting of the connection fitting is provided in such a way in the described embodiments that the mounting surfaces 9 of the mounting projections 8 of the abutment contact studs 7 extend beyond the circumference of the opening 3 or the breach or the hole only by a part of their dimension, namely with their outside-lying radial areas, when the abutment contact studs 7 are not spread apart This allows the fitting 1 to be held with the lock 16 located outside of the abutment contact studs 7 in the opening 3 so that it can be removed. A pulling movement is sufficient, when the lock 16 is withdrawn on the fitting 1, to exert if necessary a combined pivoting and tilting motion, in order to be able to move the fitting 1 out of the opening 3 again. Thus, the fitting 1 can also be dismounted when the lock 16 is withdrawn or moved back from its locking position, and after that, the already mentioned detachment movement is applied to the fitting 1, since the abutment contact studs 7 are automatically moved back into the preliminary mounting position because of their spring action.

Figure 3:
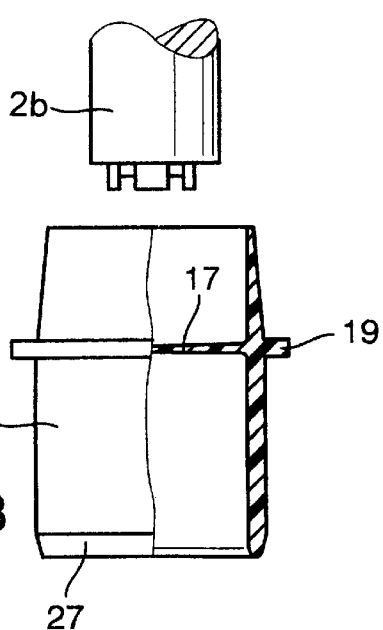
FIG. 3 is a view shown partially in longitudinal section, of the lock provided in FIGS. 1 and 2 and a cable end prior to the insertion of the cable.
Figure 4:
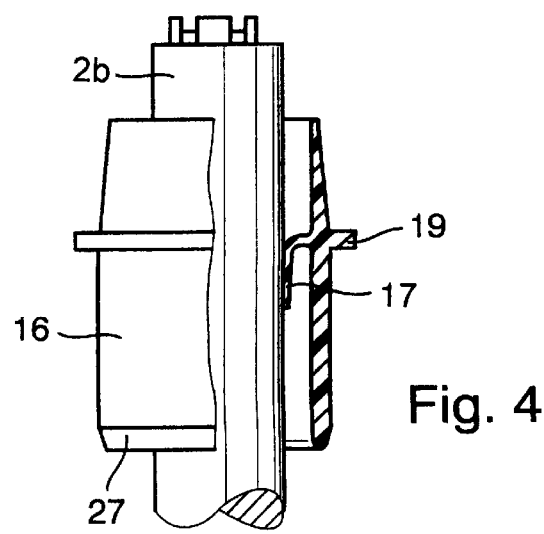
FIG. 4 is a view similar to FIG. 3 after the cable has been inserted, where the cable comes into frictional engagement with an inside lip so that the insertion of the cable also moves the lock into locking position in the plug-in direction.
Figure 11:
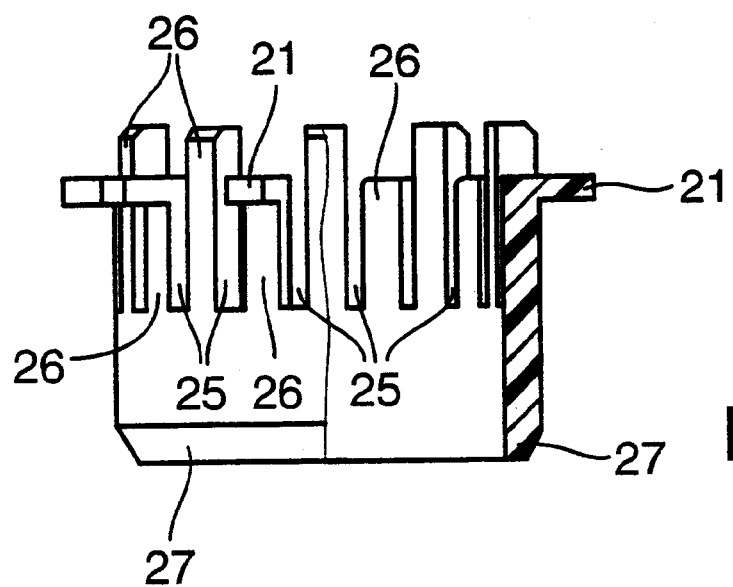
FIG. 11 is a side view, partially in longitudinal cross-section, of the lock of FIGS. 9 and 10.

In the FIGS. 3 and 4, 7 and 8, as well as 11 and 12, somewhat differently designed locks 16 are depicted. Common to these embodiments of the lock 16, is that the locks are designed in a respectively sheath-shaped manner. In addition, each at least one projection projecting radially inward (FIGS. 3 and 4) or one projection projecting radially outward (FIGS. 7 and 8, as well as FIGS. 11 and 12), or as shown in FIGS. 3 and 4, one projection projecting radially inward and one projection projecting radially outward, which are explained in greater detail below. In the embodiments according to FIGS. 3, 4, 7, and 8 the projection is impinged by the insertion of the oblong body 2a, 2b into the inside of the fitting 1.

FIGS. 3 and 4 show the projection as a lip 17 projecting radially inwardly, particularly over the entire inner circumference of the lock 16. Thereby is this radially inwardly extending projection of the lock 16, i.e. this lip 17 arranged around the inner circumference of the lock 16 in a continuous manner. However, it could also be interrupted by radial slots.

This arrangement becomes especially suitable when a cable 2b or an otherwise oblong structure having a relatively small outer dimension should be attached to the connection fitting 1, as is depicted in FIGS. 1 to 4. A cable 2b of this type can then, when axially inserted into the lock 16, displace and bend the lip 17 running around it in the plug-in direction, such that this lip rests in a force actuated manner on the outside of a cable 2b of this type, so that the insertion of the cable 2b carries the lock along with it in the axial direction and brings it from the detachable position shown in FIG. 1 to the locking position shown in FIG. 2. If this position is reached, the cable 2b can be affixed in a customary way using a clamping device 18 located on the connection fitting 1. Thus, after the detaching of this clamping device 18, the cable 2b can be withdrawn again, such that it then takes the lock 16 along with it so that the connection fitting 1 assumes the only partially or detachably caught position according to FIG. 1, and thereafter can be easily dismounted.

FIGS. 5 through 8 show a solution in which the lock carries an outwardly extending projection as a stopper shoulder 19, on which the front side of a corrugated hose 2a can come to rest when it is inserted into the connection fitting 1. Thus, by the insertion of a corrugated hose 2a into the connection fitting 1, a movement of this lock 16 and thus the definitive pivoting of the abutment contact studs 7 into their mounting position is also caused.

Moreover, a stopper 20 for the lock 16 is also provided inside the connection fitting 1, so that the lock 16 can only be moved up to its locking position and can not be moved any further beyond that. Additionally, this outside stopper collar 19, which may also be provided in addition to the lip 17 lying on the inside, as shown in the embodiment according to FIGS. 1 to 4, can also act together with this inside stopper 20 in the connection fitting 1, as is recognized from FIGS. 2 and 6.

The inner stopper 20 is thus arranged in the embodiments according to FIGS. 1 to 8 at the beginning of the abutment contact studs 7, i.e. located in the axial direction on or before the beginning of these abutment contact studs 7 is a radial expansion that in the locking position according to FIGS. 2 and 6, forms this stopper 20 for the outwardly projecting stopper collar 19 of the lock 16. It would, however, also be possible of course, to arrange stopper pieces projecting radially inwardly on the ends of the abutment contact studs 7, on which for example, the front side of the lock 16 could stop in order to limit its axial displacement.

Also in the embodiments according to FIGS. 9 to 12, the lock 16 is constructed as a sheath. Moreover, it is modified however, in that it has actuation projections 21 extend radially outwardly, as a "projection" towards its outer side, on its edge that faces away from the locking position. These projections not only extend beyond the outer dimension of the sheath shaped lock 16, but also engage in the usage position in the axially running slots 6 between the abutment contact studs 7 and project through them to the outside. This can be seen especially well in FIG. 10F. Thus, these actuation projections 21 can be acted upon in order to move the lock in the axial direction into the locking position on the on hand, and on the other hand, to move it back again out of the locking position.

Moreover, in this embodiment for the axial adjustment of the actuation projections 21 on the outer side of the connection fitting 1, an axially adjustable ring 22 that can be affixed and that impinges the actuation projections 21 is provided. A ring groove 23 runs around in the inside of the ring 20 at a uniform height, and in which the radially projecting actuation projections 21 engage according to FIGS. 9 and 10 and in particular, in an interlocking manner according to FIGS. 9E and 10F. Especially in comparison of the FIGS. 9E and 10F, it is apparent that an axial adjustment of the ring 22 carries with it the actuation projections 21 in this manner so that the lock 16 is also axially adjusted.

In an especially practical manner, the ring 22 for the adjustment of the lock 16 is a nut having inner threads fitted to and acting together with an adjustment threading 24 provided on the outside on the connection fitting 1, the adjustment threading 24 of which is arranged in the embodiment on the outer sides of the abutment contact studs 7 and continues over each of the slots 6 located between them. In this way, the ring 22 constructed as a nut can be turned and thus simultaneously with the help of the adjustment threading 24 be axially adjusted, without the lock 16 turning along with it, however, under the simultaneous axial adjustment of this lock 16 and its actuation projections 21 that are axially movable within the slots 6. Moreover, the front side of the ring 22 facing the wall 4 contains the seal 13 and forms the stopper 14 on the outer side of the wall 4 in the usage position, when the lock 16 assumes its locking position.

Figure 12:
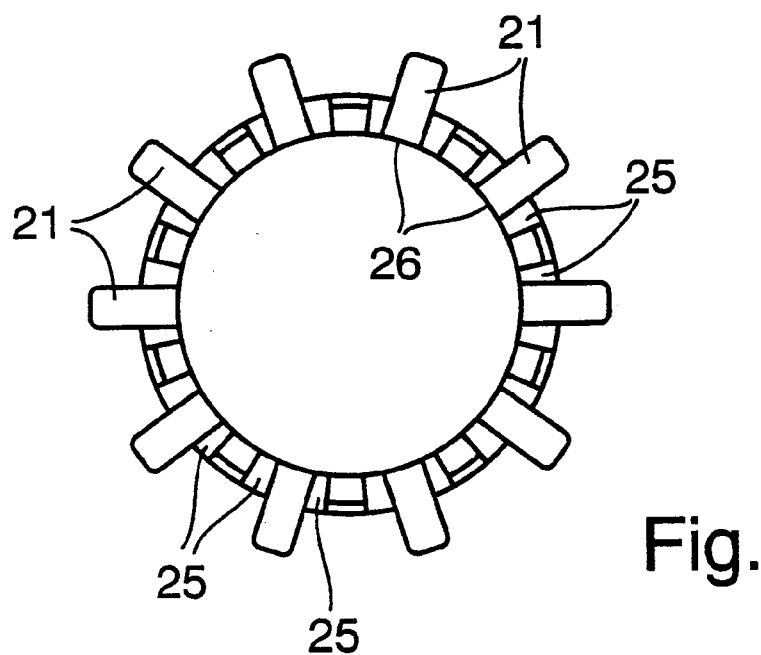
FIG. 12 is an overhead view of the lock that is provided with radially projecting projections and that is provided in the embodiment according to FIGS. 9 and 10, but would also be able to be used in the same manner for a fitting that is not designed as an angle piece.

Although it would be conceivable to manage with only a single actuation projection 21 or perhaps with two actuation projections 21 arranged opposite each other over a diameter, as shown in FIG. 12, the sheath-shaped lock 16 has several actuation projections 21 distributed on its circumference, which are each separated from each other by axial slots 25 and held as a single piece by rails 26 that are resilient and separated by the slots 25. Here, it will be recognized from both FIGS. 11 and 12, that the lock 16 has on its end that faces away from the locking position, more of these axial slots 25 distributed over its circumference than radially projecting actuation projections 21, in this case twice as many axial slots 25 as actuation components 21, i.e. only every second rail 26 carries an actuation projection 21, while the remaining rails 26 still project somewhat in the axial direction towards these actuation projections 21. Thus, these rails 26 constructed without actuation projections 21 can be slid along on the inside and guided on the abutment contact studs 7.

Since the lock 16 is forcibly held and forcibly guided by the actuation projections 21, in this case, in both adjustment directions, there is no need for any interlocking or force-actuated combined action with the oblong body 2a, 2b, as is provided in the embodiments according to FIGS. 1 to 4 and according to FIGS. 5 to 8. Thus, the connection fitting 1 can be firmly mounted for use by a lock 16 with actuation projections 21 according to FIGS. 9 to 12, even when no oblong body 2 is inserted, or this oblong body 2—for example a corrugated hose 2a according to FIGS. 9 and 10—does not extend into or through the attachment area. This can be especially useful for an angle piece according to FIGS. 9 and 10 or a T-shaped connection fitting, but also however, for a connection fitting according to FIGS. 1 to 8.

The arrangement of the actuation projections 21 on resilient rails 26 that are separated from each other by slots allows a simple assembly, because the rails 26 can be deformed radially inwardly with the actuation projections 21, when the actuation ring 22 is coupled to them, and they automatically spring back radially outwardly when the ring groove 23 has reached the level of the actuation projections 21. Thus, a simple assembling ability results.

In addition, it should still be mentioned that the edge 27 of the lock 16 located in the locking area is sloped on the outside in all embodiments such that a cone is formed which allows easier insertion between the elastic abutment contact studs 7 that are pivotable radially outwardly outside against a restoring force for final attachment.

The connection fitting 1 functions for the attachment of hoses, corrugated hoses, pipes, cables, or other oblong bodies on or in an opening or hole 3 of a wall 4, for example, a housing. Moreover, the connection fitting 1 has an attachment projection 5 that can be anchored in this opening 3 and that has retaining projections 8, projecting radially outwardly opposite to a constriction, on abutment contact studs 7 formed by axial slots 6. The abutment contact studs 7 and their retaining projections 8 are formed in such a way that they have only a part of their retaining effect after insertion of the attachment projection 5 into the opening 3, i.e. they can be moved out of the opening 3 under a loading opposite to the insertion direction. For a final attachment that is resistant to pulling force and compression, inside the connection fitting 1 an axially movable and generally sheath-shaped lock 16 is provided which locks the elastic abutment contact studs 7 with their retaining projections 8 in the usage position against a radial deformation and resilience, and in particular, pivots them outwardly so that the locking and retaining surfaces 9 of the retaining projections 8 grasp behind the edge 12 more than in the preliminary mounting position.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. Connection fitting (1) for attaching an oblong body (2a, 2b) to an opening (3) in a wall (4) of a housing, the connection fitting (1) comprising:

at least one attachment projection (5) that is divided by open slots (6) into abutment contact studs (7) having free ends, with radially outwardly extending retaining projections (8) arranged on the free ends, the abutment contact studs (7) being deformable radially inwardly as the attachment projection (5) is inserted into the opening (3) by an edge (15) of the opening, the abutment contact studs (7) being movable into a mounting position behind a second edge (12) of the opening in which the retaining projections (8) at least partially grasp behind the second edge (12);

at least one stopper (14) arranged at a distance from the retaining projections (8), the stopper when in a usage position resting on the edge (15) of the opening opposite to the second edge (12) of the opening (3) that is engaged by the retaining projections, the abutment contact studs (7) and the radially projecting retaining projections (8) being shaped or dimensioned in such a manner that the retaining projections are adapted to be detachably engaged on the second edge (12) after insertion into the opening (3), and under a loading acting opposite a plug-in direction, are withdrawn from the opening (3); and an axially movable lock (16) located inside the connection fitting (1), the lock being movable from a detaching position, spaced apart from the abutment contact studs (7), to the usage position, wherein the lock is engaged between the abutment contact studs (7) to lock the retaining projections (8) in the usage position against radially inward deformation.

2. Connection fitting according to claim 1, wherein the retaining projections (8) include catch surfaces (9) that are beveled with respect to a plane running radially to the connection fitting (1) such that a bevel runs from inside to outside away from the edge (12) of the opening (3) such that a cone expanding in a direction away from an inside of the opening (3) results.

3. Connection fitting according to claim 2, wherein in the usage position the beveled catch surfaces of the retaining projections facing the second edge of the opening are at least one of concave, spherically convex and straight.

4. Connection fitting according to claim 1, wherein the abutment contact studs (7), in an area adapted to be located within the opening (3) in the usage position, have a smaller outer circumference than the opening (3), and movement of the lock (16) in an axial direction between the abutment contact studs causes the studs to be spread apart.

5. Connection fitting according to claim 4, wherein the retaining projections (8) of the abutment contact studs (7) include catch surfaces (9) that only extend beyond the circumference of the opening (3) by a portion of the dimension of the catch surfaces such that when the abutment contact studs (7) are not spread apart, the fitting (1) is held in the opening such that the fitting can be withdrawn from the opening (3), when the lock (16) is located outside of the abutment contact studs (7).

6. Connection fitting according to claim 1, wherein the axially movable lock (16) is shaped like a sheath and has at least one projection that extends at least one of radially inwardly and radially outwardly, the at least one projection being impinged by insertion of the oblong body (2a, 2b) into the connection fitting (1).

7. Connection fitting according to claim 6, wherein the projection extends radially inwardly in the lock (16) and is deformable against a restoring force, and in the usage position, the projection is adapted to contact an outside of the oblong body (2) with pressure.

8. Connection fitting according to claim 7, wherein at least one lip (17) bendable in the axial direction and arranged around an entire inner circumference of the lock (16) is located inside of the lock (16) as the projection.

9. Connection fitting according to claim 7, wherein the projection extending radially inwardly in the lock (16) comprises a lip (17) on an inner circumference of the lock (16) and extends in a continuous manner around the circumference.

10. Connection fitting according to claim 1, wherein a stopper (21) is provided for the lock (16) within the connection fitting (1).

11. Connection fitting according to claim 10, wherein the stopper (21) for the lock (16) is arranged at a beginning of the abutment contact studs (7) and is formed as a diameter enlargement.

12. Connection fitting according to claim 1, wherein the lock (16) is constructed as a sheath that has at least one actuation projection (21) projecting radially outwardly on an edge of the projection that faces away from the usage position, the actuation projection (21) extends beyond an outer dimension of the lock (16) and in the usage position, extends through the slot (6) between the abutment contact studs (7), and projects through the slot to an outside of the connection fitting.

13. Connection fitting according to claim 12, wherein for axial adjustment of the at least one actuation projection (21), a ring (22) that is axially adjustable and that impinges the at least one actuation projection (21), is provided on the outside of the connection fitting (1).

14. Connection fitting according to claim 13, wherein at least one ring groove (23) is arranged in an inside of the ring (22), into which the at least one radially projecting actuation projection (21) engages in an interlocking manner.

15. Connection fitting according to one claim 1, wherein a plurality of actuation projections (21) that are separated from each other by axial slots (25) distributed on a circumference of the lock (16) and the actuation projections (21) are held as a single piece by resilient rails (26) separated by the axial slots (25).

16. Connection fitting according to claim 15, wherein the lock (16) has more axial slots (25) than radially extending projections (21) distributed on the circumference on an end that faces away from the usage position.

17. Connection fitting according to claim 13, wherein the ring (22) for shifting the lock (16) is a nut having internal threads that fit together with an adjustment threading (24) provided on the outside of the connection fitting (1), and the adjustment threading (24) is arranged on outer sides of the abutment contact studs (7) and continues over the slots (6) located between the studs.

18. Connection fitting according to claim 1, wherein a front-side edge (27) of the lock (16) located in a locking area is one of slanted and rounded off on the outside.

* * * * *